(12) United States Patent
Nagao et al.

(10) Patent No.: US 12,146,562 B2
(45) Date of Patent: Nov. 19, 2024

(54) ROTARY MECHANICAL SYSTEM AND MAINTENANCE METHOD OF ROTARY MECHANICAL SYSTEM

(71) Applicant: MITSUBISHI HEAVY INDUSTRIES COMPRESSOR CORPORATION, Tokyo (JP)

(72) Inventors: Hideki Nagao, Hiroshima (JP); Hiroyuki Miyata, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 12 days.

(21) Appl. No.: 18/171,806

(22) Filed: Feb. 21, 2023

(65) Prior Publication Data

US 2023/0265918 A1 Aug. 24, 2023

(30) Foreign Application Priority Data

Feb. 24, 2022 (JP) ................................. 2022-026639

(51) Int. Cl.
*F16H 57/023* (2012.01)
*F16H 1/46* (2006.01)
(Continued)

(52) U.S. Cl.
CPC ............. *F16H 57/023* (2013.01); *F16H 1/46* (2013.01); *F16H 57/031* (2013.01);
(Continued)

(58) Field of Classification Search
CPC .... F16H 57/023; F16H 57/031; F16H 57/082; F16H 1/46; F16H 2057/02034; F16H 2057/0235; H02K 7/116
See application file for complete search history.

(56) References Cited

U.S. PATENT DOCUMENTS 1,860,703 A * 5/1932 Christian ............... H02K 7/116
74/421 A
3,592,078 A * 7/1971 Stark ................. F16H 57/02004
74/665 GD
(Continued)

FOREIGN PATENT DOCUMENTS

EP 4063659 A1 9/2022
JP 2008-038679 A 2/2008
(Continued)

*Primary Examiner* — Thomas C Diaz
(74) *Attorney, Agent, or Firm* — Osha Bergman Watanabe & Burton LLP

(57) ABSTRACT

A rotary mechanical system includes a driving machine, a transmission unit that includes a main shaft, a main gear, an auxiliary gear meshing with the main gear, an auxiliary shaft, and a first gear, a gearbox that includes a second gear meshing with the first gear, an input shaft with the second gear fixed, and an output shaft that shifts a rotation speed of the input shaft, and a rotary machine that includes a rotary machine shaft connected to the output shaft. The first gear is a spur gear having a plurality of first tooth portions which are spur teeth whose teeth traces are parallel to the central axis. The second gear has a plurality of second tooth portions which are spur teeth whose teeth traces are parallel to the central axis, and each of which is disposed between the adjacent first tooth portions.

9 Claims, 7 Drawing Sheets

(51) Int. Cl.
  *F16H 57/031*   (2012.01)
  *F16H 57/08*    (2006.01)
  *H02K 7/116*    (2006.01)
  *F16H 57/02*    (2012.01)

(52) U.S. Cl.
  CPC ........... *F16H 57/082* (2013.01); *H02K 7/116* (2013.01); *F16H 2057/02034* (2013.01); *F16H 2057/0235* (2013.01)

(56) References Cited

U.S. PATENT DOCUMENTS

| | | | |
|---|---|---|---|
| 9,309,806 B2 * | 4/2016 | Kuroda | F16H 57/021 |
| 11,519,416 B2 * | 12/2022 | Miyata | F04D 25/16 |
| 2007/0264122 A1 | 11/2007 | Iwasaki et al. | |
| 2008/0240918 A1 * | 10/2008 | In | F04D 29/083 |
| | | | 415/230 |
| 2017/0366066 A1 | 12/2017 | Ta et al. | |
| 2019/0093742 A1 | 3/2019 | Okamoto | |
| 2019/0186600 A1 | 6/2019 | Miyata et al. | |

FOREIGN PATENT DOCUMENTS

| | | |
|---|---|---|
| JP | 2018-013242 A | 1/2018 |
| JP | 2021-156290 A | 10/2021 |

* cited by examiner

ROTARY MECHANICAL SYSTEM AND MAINTENANCE METHOD OF ROTARY MECHANICAL SYSTEM

BACKGROUND OF THE INVENTION

Field of the Invention

The present disclosure relates to a rotary mechanical system and a maintenance method of the rotary mechanical system.

Priority is claimed on Japanese Patent Application No. 2022-26639, filed on Feb. 24, 2022, the content of which is incorporated herein by reference.

Description of Related Art

Gears are frequently used to transmit driving force between a driving machine such as a motor and a rotary machine driven by the driving machine. For example, Patent Document 1 discloses a configuration in which a rotary drive shaft of a motor and a rotating shaft of an axial fan are connected via a gear accommodated in a gearbox. In this configuration, the rotating shaft of the axial fan includes a rotating shaft accommodated in the gearbox. In the gearbox, the rotary drive shaft of the motor is inserted through a through hole formed in the gearbox. An axial fan-side gear provided on the rotating shaft of the axial fan and a motor-side gear provided on the rotary drive shaft of the motor mesh in a gearbox.

CITATION LIST

Patent Document

[Patent Document 1] Japanese Unexamined Patent Application, First Publication No. 2008-38679

SUMMARY OF THE INVENTION

However, with the configuration described in Patent Document 1, when the motor and the axial fan are to be separated for maintenance, for example, the gearbox needs to be disassembled and the rotary drive shaft of the motor and the like needs to be removed from the gearbox. As described above, disconnecting the connection between the driving machine and the rotary machine takes a lot of work. In particular, when a transmission is disposed between the driving machine and the rotary machine, similar problems occur between the driving machine and the transmission. For this reason, it is desired to improve maintainability in a system having a connecting portion between the rotating shafts of the rotary machine.

The present disclosure provides a rotary mechanical system and a maintenance method of the rotary mechanical system that can improve maintainability.

According to an aspect of the present disclosure, there is provided a rotary mechanical system including a driving machine that includes a drive shaft that is rotationally driven around a central axis, a transmission unit that includes a main shaft connected to the drive shaft, a main gear fixed to the main shaft, an auxiliary gear meshing with the main gear, at least one auxiliary shaft fixed to the auxiliary gear, and a first gear rotatable together with the at least one auxiliary shaft, at least one gearbox that includes a second gear meshing with the first gear, and an output shaft that configured to shift and output a rotation speed of the second gear, and at least one rotary machine that includes a rotary machine shaft connected to the output shaft and in which the rotary machine shaft is rotationally driven by transmission of a rotation of the output shaft, in which the first gear is a spur gear having a plurality of first tooth portions which are spur teeth whose teeth traces are parallel to the central axis, and the second gear has a plurality of second tooth portions which are spur teeth whose teeth traces are parallel to the central axis, and each of which is disposed between adjacent first tooth portions among the plurality of first tooth portions.

According to an aspect of the present disclosure, there is provided a maintenance method of a rotary mechanical system including a driving machine that includes a drive shaft that is rotationally driven around a central axis, a transmission unit that includes a main shaft connected to the drive shaft, a main gear fixed to the main shaft, an auxiliary gear meshing with the main gear, at least one auxiliary shaft fixed to the auxiliary gear, and a first gear rotatable together with the at least one auxiliary shaft, at least one gearbox that includes a second gear meshing with the first gear, and an output shaft that configured to shift and output a rotation speed of the second gear, and at least one rotary machine that includes a rotary machine shaft connected to the output shaft and in which the rotary machine shaft is rotationally driven by transmission of a rotation of the output shaft, the first gear having a plurality of first tooth portions which are spur teeth whose teeth traces are parallel to the central axis, and the second gear having a plurality of second tooth portions which are spur teeth whose teeth traces are parallel to the central axis, and each of which is disposed between adjacent first tooth portions among the plurality of first tooth portions, the maintenance method including a step of relatively moving at least one of the transmission unit and the at least one gearbox to be apart from each other in an axial direction in which the central axis extends to release meshing between the first gear and the second gear from each other, a step of performing maintenance on at least one of the transmission unit and the at least one gearbox, and a step of relatively moving at least one of the transmission unit and the at least one gearbox to come close to each other in the axial direction to mesh the first gear and the second gear with each other.

According to the rotary mechanical system and the maintenance method of the rotary mechanical system of the present disclosure, it is possible to improve maintainability.

DETAILED DESCRIPTION OF THE INVENTION

Hereinafter, embodiments in which a rotary mechanical system and a maintenance method of the rotary mechanical system according to the present disclosure are implemented will be described with reference to the accompanying drawings. However, the present disclosure is not limited to these embodiments.

(Configuration of Compressor System)

Figure 1:
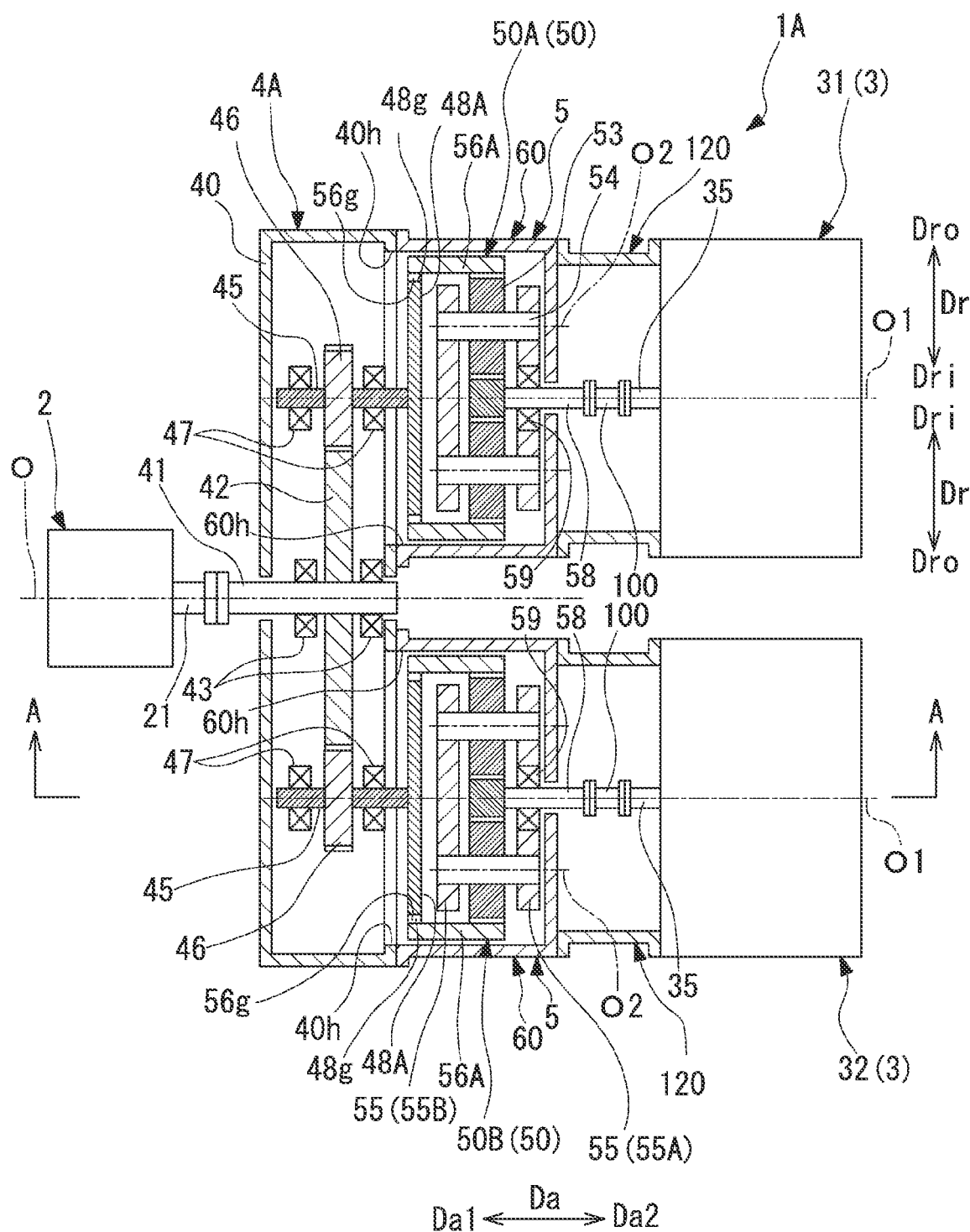
FIG. 1 is a schematic view showing a schematic configuration of a rotary mechanical system according to a first embodiment of the present disclosure.

As shown in FIG. 1, in a rotary mechanical system 1A, one driving machine 2 operates a plurality of compressors 3 at a high speed. In the rotary mechanical system 1A, the plurality of compressors 3 are arranged on the same side with respect to the driving machine 2, and the plurality of compressors 3 are coupled in parallel to the one driving machine 2. As shown in FIG. 1, the rotary mechanical system 1A of the present embodiment includes the driving machine 2, the compressor 3 as at least one rotary machine, a transmission unit 4A, and at least one gearbox 5. In the rotary mechanical system 1A, the driving machine 2, the transmission unit 4A, the at least one gearbox 5, and the plurality of compressors 3 are disposed in this order from a first side Da1 toward a second side Da2 in an axial direction Da in which a central axis O extends. In the rotary mechanical system 1A of the present embodiment, only one driving machine 2 is disposed.

The driving machine 2 is rotationally driven to generate power for driving the compressor 3. The driving machine 2 includes a drive shaft 21 that rotates about the central axis O. Only one drive shaft 21 is disposed. The drive shaft 21 is formed in a columnar shape centered on the central axis O. The driving machine 2 of the present embodiment is a motor that drives the drive shaft 21. As the driving machine 2, a steam turbine or the like can be adopted in addition to the motor as long as the power for driving the compressor 3 can be generated.

Each compressors 3 includes a rotary machine shaft 35 that rotates about a first center line O1 that extends parallel to the central axis O. The rotary machine shaft 35 is formed in a columnar shape centered on the first center line O1. The compressor 3 compresses a gas as a working fluid. The compressor 3 compresses the gas using an impeller (not shown) provided on the rotary machine shaft 35. The compressor 3 of the present embodiment is, for example, a uniaxial multi-stage centrifugal compressor that compresses a hydrogen gas. As the compressor 3 of the present embodiment, there are three compressors, that is, a first compressor 31, a second compressor 32, and a third compressor (not shown). That is, the compressors 3 is a plurality of rotary machines. The plurality of rotary machines are arranged as the at least one rotary machine, in the present embodiment. The first compressor 31, the second compressor 32, and the third compressor are connected in this order via a pipe (not shown). In the rotary mechanical system 1A, the gas to be compressed is introduced in the order of the first compressor 31, the second compressor 32, and the third compressor and is sequentially compressed. The gas is compressed in the third compressor and then is supplied to an external supply destination of the rotary mechanical system 1A. The plurality of compressors 3 are not limited to being disposed to be connected in order to be coupled to each other. The plurality of compressors 3 may be disposed in parallel so that the plurality of compressors 3 can be separated from each other and be operated independently.

(Configuration of Transmission Unit)

The transmission unit 4A increases a speed of the rotation of the drive shaft 21 and transmits the rotation to the plurality of gearboxes 5. The transmission unit 4A connects one drive shaft 21 and the plurality of gearboxes 5 to each other. That is, the plurality of gearboxes 5 are arranged as the at least one gearbox 5, in the present embodiment. The transmission unit 4A of the present embodiment includes a casing 40, a main shaft 41, a main gear 42, a main shaft bearing 43, at least one auxiliary shaft 45, an auxiliary gear 46, a first bearing 47, and a first gear 48A.

The casing 40 constitutes the exterior of the transmission unit 4A. The casing 40 internally accommodates the main shaft 41, the main gear 42, the main shaft bearing 43, the at least one auxiliary shaft 45, the auxiliary gear 46, and the first bearing 47.

The main shaft 41 rotates together with the drive shaft 21. The main shaft 41 transmits the rotation of the drive shaft 21 to the auxiliary gear 46 via the main gear 42. The main shaft 41 is connected to an end portion of the drive shaft 21 outside the casing 40. The main shaft 41 is rotationally driven about the central axis O by the drive shaft 21. The main shaft 41 is formed in a columnar shape centered on the central axis O. That is, the main shaft 41 is disposed to be coaxial with the drive shaft 21. The main shaft 41 passes through the casing 40 so that a tip of the main shaft 41 is disposed in the casing 40.

The main gear 42 is fixed to the main shaft 41 in the casing 40. The main gear 42 is an external gear formed in a disk shape centered on the central axis O. The main gear 42 of the present embodiment has the largest outer diameter among the gears used in the transmission unit 4A and the gearbox 5. The main gear 42 is not limited to having the largest outer diameter among the gears used in the transmission unit 4A.

The main shaft bearing 43 rotatably supports the main shaft 41 with respect to the casing 40. The main shaft bearing 43 is fixed inside the casing 40. The main shaft bearing 43 of the present embodiment is a journal bearing. A pair of main shaft bearings 43 is disposed with respect to the main shaft 41 so that the main gear 42 is interposed therebetween.

A plurality of the auxiliary shafts 45 are disposed radially outward of the main shaft 41 and spaced apart from each other in a radial direction of the main shaft 41 in a circumferential direction with respect to the main shaft 41. That is, the plurality of the auxiliary shafts 45 are arranged as the at least one auxiliary shaft 45, in the present embodiment. The rotation of each of the plurality of auxiliary shafts 45 is transmitted to the gearbox 5 such that the gearbox 5 corresponds to each of the plurality of auxiliary shafts 45. The rotation of the main shaft 41 is transmitted to each auxiliary shaft 45 and the auxiliary shaft 45 rotates together with the main shaft 41. The auxiliary shaft 45 is formed in a columnar shape centered on a first center line O1 extending parallel to the central axis O. The auxiliary shaft 45 is disposed at a position disposed radially outward of the main shaft 41 and spaced apart from each other in the radial direction of the main shaft 41. The auxiliary shaft 45 extends parallel to the main shaft 41. The auxiliary shaft 45 rotates about the first center line O1 as the main shaft 41 rotates. An end portion of the auxiliary shaft 45 on the second side Da2 in the axial direction Da is disposed outside the casing 40. That is, the auxiliary shaft 45 extends to protrude from the casing 40.

The auxiliary gear 46 meshes with the main gear 42. The auxiliary gear 46 is fixed to the auxiliary shaft 45. The auxiliary gear 46 is an external gear formed in a disk shape centered on the first center line O1. The auxiliary gear 46 of the present embodiment has an outer diameter smaller than that of the main gear 42. The auxiliary gear 46 is not limited to having the outer diameter smaller than that of the main gear 42. For example, the auxiliary gear 46 may have the same diameter as that of the main gear 42.

Figure 2:
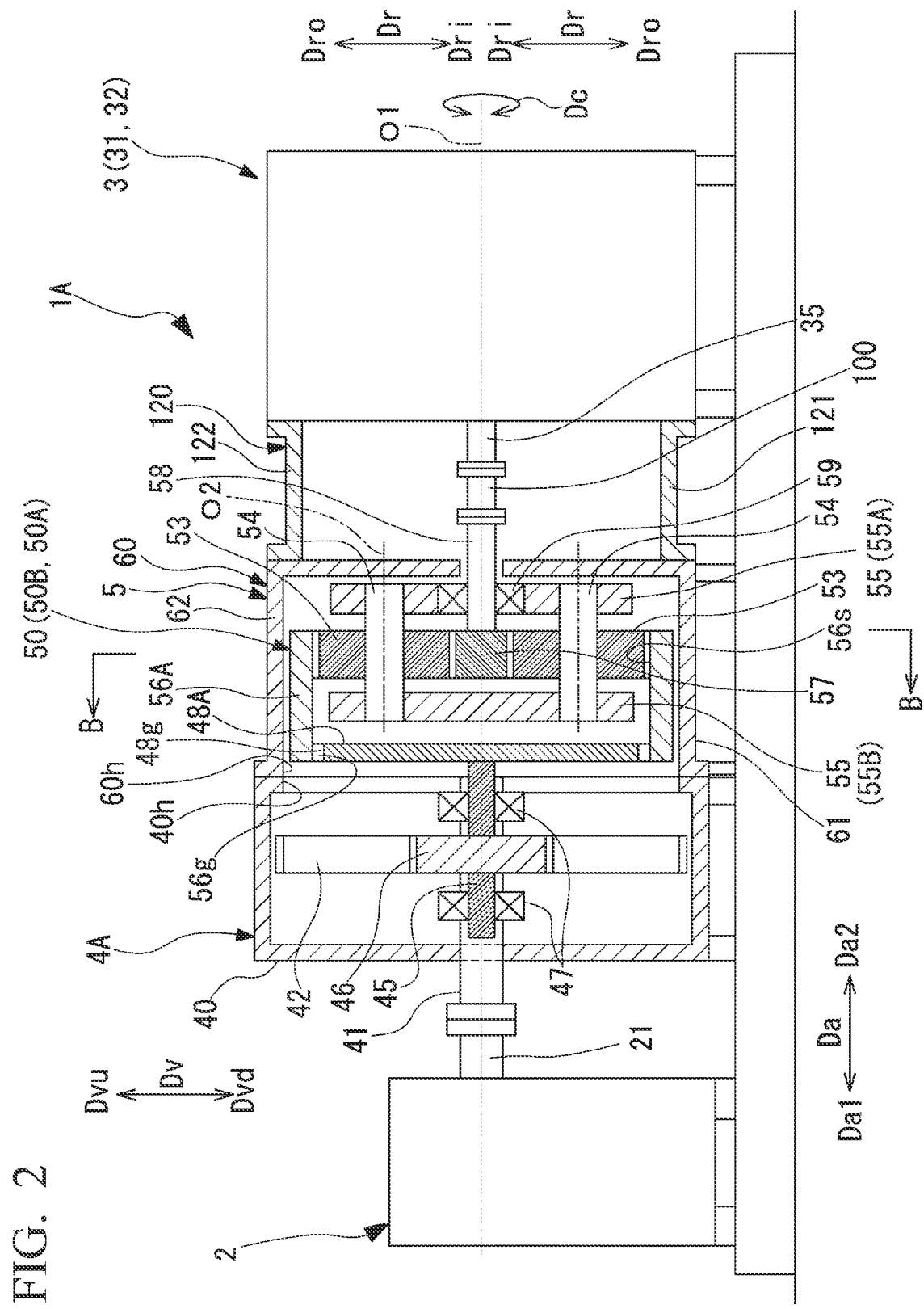
FIG. 2 is a cross-sectional view taken along line A-A in FIG. 1.

As shown in FIGS. 1 and 2, the first bearing 47 rotatably supports the auxiliary shaft 45 with respect to the casing 40. The first bearing 47 is fixed inside the casing 40. The first bearing 47 of the present embodiment is a journal bearing. The first bearing 47 may be a bearing having the same type and size as the main shaft bearing 43, or may be a bearing having a type and size different from those of the main shaft bearing 43, as long as the first bearing 47 is a journal bearing. Therefore, the first bearing 47 may be a rolling bearing or a slide bearing. When the first bearing 47 is a slide bearing, for example, the first bearing 47 may be a sleeve type bearing that is not divided in the circumferential direction and is formed in a tubular shape. When the first bearing 47 is a slide bearing, for example, the first bearing 47 may be a tilting pad bearing having a plurality of pads divided in the circumferential direction. A pair of first bearings 47 is disposed with respect to the auxiliary shaft 45 so that the auxiliary gear 46 is interposed.

The first gear 48A is fixed to the auxiliary shaft 45. The first gear 48A is rotatable about the first center line O1 together with the auxiliary shaft 45. The first gear 48A is fixed to an end portion of the auxiliary shaft 45 on the second side Da2 in the axial direction Da. The first gear 48A is disposed outside the casing 40 so that the first gear 48A protrudes from the casing 40 to the second side Da2 in the axial direction Da. The first gear 48A is an external gear formed in a disk shape centered on the first center line O1. The first gear 48A of the present embodiment has a larger outer diameter than that of the auxiliary gear 46. The first gear 48A is a spur gear having a plurality of first tooth portions 48g which are spur teeth whose teeth traces are parallel to the central axis O (first center line O1). The plurality of first tooth portions 48g are disposed to be evenly spaced apart in a circumferential direction Dc of the first gear 48A centered on the first center line O1. A tooth surface of the first tooth portion 48g facing the circumferential direction Dc is parallel to the central axis O (first center line O1).

The auxiliary shaft 45 is disposed in a state of being inserted through a first insertion hole (insertion hole) 40h formed in the casing 40. A first insertion hole 40h is formed to pass through the wall surface of the casing 40 on the second side Da2 in the axial direction Da. The first insertion hole 40h is formed to have a size through which the first gear 48A is insertable.

(Configuration of Planetary Gear Mechanism)

The gearbox 5 increases a speed of the rotation of the first gear 48A and transmits the rotation to the compressor 3. The gearbox 5 connects one first gear 48A and one gearbox 5. During a rated operation of the compressor 3, the gearbox 5, together with the transmission unit 4A, rotates a sun shaft 58 to be described below so that a speed of the sun shaft 58 increases to a peripheral speed of about 10,000 rotations or more and 100,000 rotations or less. The gearbox 5 of the present embodiment includes a plurality of planetary gear mechanisms 50 and a gearbox casing 60.

The plurality of planetary gear mechanisms 50 are gear mechanisms disposed to surround the main shaft 41. Each planetary gear mechanism 50 is connected to one corresponding compressor 3 in a one-to-one relationship. Each planetary gear mechanism 50 transmits the rotation of the main shaft 41 to the rotary machine shaft 35 of one corresponding compressor 3. In the present embodiment, three planetary gear mechanisms, that is, a first planetary gear mechanism 50A connected to the first compressor 31, a second planetary gear mechanism 50B connected to the second compressor 32, and a third planetary gear mechanism (not shown) connected to the third compressor are disposed to be evenly spaced apart from each other in the gearbox casing 60. In the present embodiment, the first planetary gear mechanism 50A, the second planetary gear mechanism 50B, and the third planetary gear mechanism (not shown) have the same configuration. As shown in FIG. 2, each planetary gear mechanism 50 in the present embodiment includes a plurality of planetary gears 53, a plurality of planetary gear shafts 54, a gear support portion 55, a second gear 56A, a sun gear 57, a sun shaft (output shaft) 58, and a second bearing 59.

Figure 3:
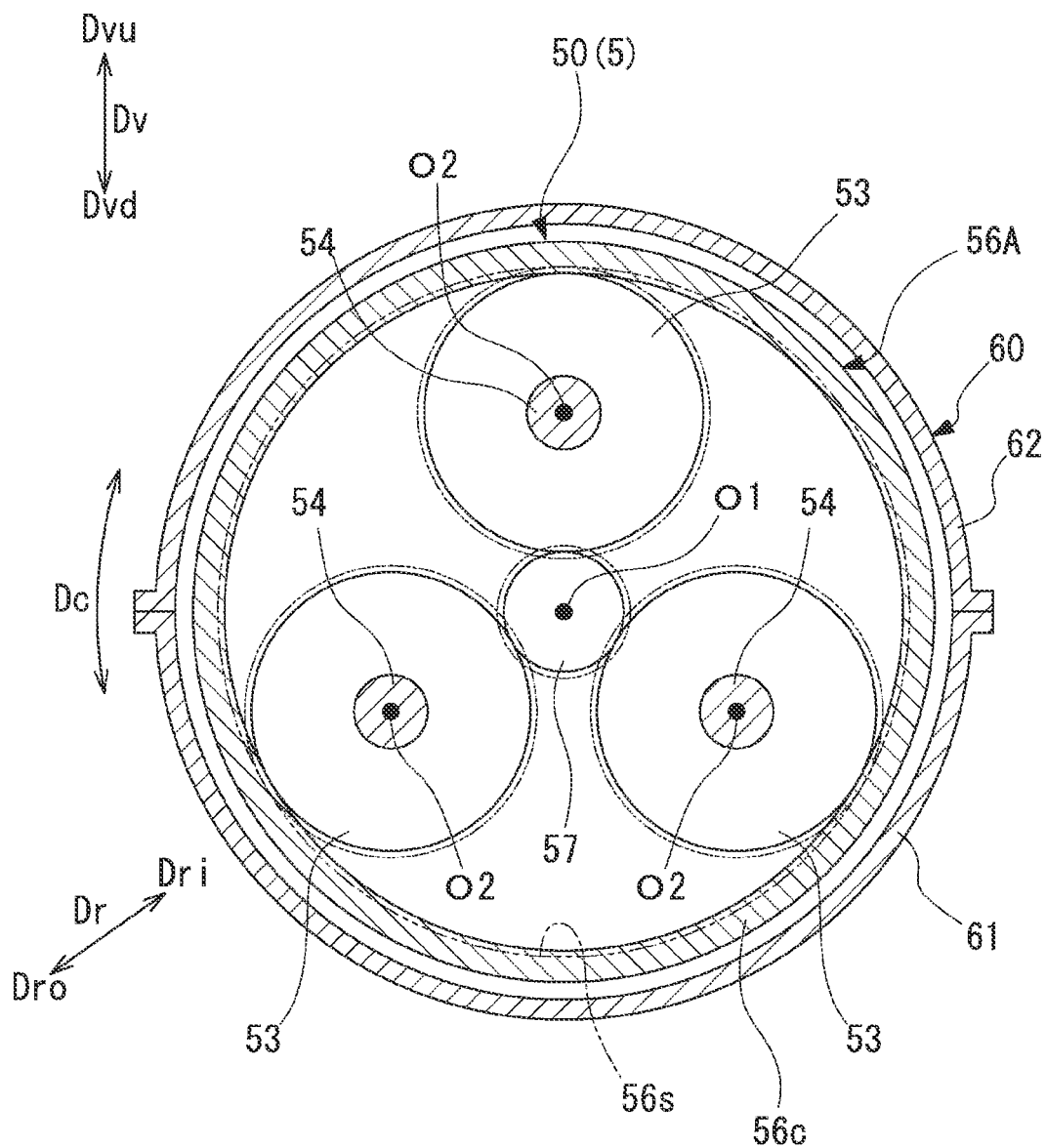
FIG. 3 is a cross-sectional view taken along line B-B in FIG. 2.

The rotation of first gear 48A is transmitted to the plurality of planetary gears 53 via the second gear 56A, and the plurality of planetary gears 53 rotate together with the rotation of the auxiliary shaft 45. The plurality of planetary gears 53 are disposed on an outside Dro in a radial direction Dr of the auxiliary shaft 45 with respect to the auxiliary shaft 45. As shown in FIG. 3, the plurality of planetary gears 53 are spaced apart from each other in the circumferential direction Dc of the sun shaft 58. In the present embodiment, the three planetary gears 53 are disposed to be evenly spaced apart from each other in the circumferential direction Dc. The number of planetary gears 53 is not limited to three, but may be two or more, and four or more may be disposed. In this case, it is preferable that three or more of the planetary gears 53 are disposed to be evenly spaced apart from each other. Each planetary gear 53 is an external gear formed in a disk shape centered on the second center line O2. The plurality of planetary gears 53 do not revolve, but only rotate about the second center line O2, which is their own center line.

As shown in FIG. 2, the planetary gear shaft 54 is a planetary gear shaft that rotates together with the planetary gear 53. The planetary gear shaft 54 is formed in a columnar shape centered on the second center line O2 extending parallel to the central axis O and the first center line O1. The planetary gear shaft 54 is disposed at a position spaced apart from the auxiliary shaft 45 to the outside Dro in the radial direction Dr of the auxiliary shaft 45. The planetary gear shaft 54 extends parallel to the main shaft 41 and the auxiliary shaft 45. The planetary gear shaft 54 supports the planetary gear 53 to be rotatable about the second center line O2.

The gear support portion 55 supports the plurality of planetary gears 53 to be rotatable. The gear support portion 55 of the present embodiment has a first gear support portion 55A and a second gear support portion 55B. Specifically, the first gear support portion 55A and the second gear support portion 55B are planetary carriers that support both ends of the plurality of planetary gear shafts 54 to be rotatable about the second center line O2. The first gear support portion 55A and the second gear support portion 55B maintain mutual positions of the plurality of planetary gear shafts 54 so that the plurality of planetary gear shafts 54 do not move. The first gear support portion 55A is fixed to the gearbox casing 60 in a non-movable state. The second gear support portion 55B is not fixed to the gearbox casing 60.

As shown in FIGS. 1 and 2, the second gear 56A meshes with the first gear 48A. The second gear 56A is disposed in the gearbox casing 60. The second gear 56A of the present embodiment is formed in a cylindrical shape extending in the axial direction Da about the first center line O1. The second gear 56A is formed to have a size through which the first gear 48A is insertable. A second tooth portion 56g is formed at an end portion of the second gear 56A on the first side Da1 in the axial direction Da. The second tooth portion 56g is formed on an inner peripheral surface of the second gear 56A facing an inside Dri in the radial direction Dr. That is, the second gear 56A is an internal gear having the second tooth portion 56g on the inner peripheral surface. A plurality of second tooth portions 56g are spaced apart from each other in the circumferential direction Dc of the second gear 56A. Each second tooth portion 56g is a spur tooth whose tooth trace is parallel to the central axis O. A tooth surface of the second tooth portion 56g facing the circumferential direction Dc is parallel to the central axis O (first center line O1). The second tooth portion 56g meshes with the first tooth portion 48g. The number of teeth of the first tooth portion 48g and the number of teeth of the second tooth portion 56g are the same. The second tooth portion 56g is disposed between the first tooth portions 48g adjacent in the circumferential direction Dc among the plurality of first tooth portions 48g. When the second gear 56A is in a state of meshing with the first gear 48A, the second tooth portion 56g is in contact with the first tooth portion 48g. As a result, the second gear 56A rotates together with the auxiliary shaft 45.

Planetary meshing tooth 56s that meshes with the plurality of planetary gears 53 are formed at an end portion of the second gear 56A on the second side Da2 in the axial direction Da. The planetary meshing tooth 56s is formed on the inner peripheral surface of the second gear 56A. The planetary meshing tooth 56s meshes with the plurality of planetary gears 53. As shown in FIG. 3, the second gear 56A meshes with the plurality of planetary gears 53 accommodated therein from the outside Dro in the radial direction Dr. The second gear 56A rotates together with the first gear 48A and the auxiliary shaft 45 to transmit the rotation of the auxiliary shaft 45 to the plurality of planetary gears 53 disposed inside. In addition, the planetary meshing tooth 56s may be formed integrally with the second tooth portions 56g, or may be formed separately.

The sun gear 57 is an output gear that meshes with the plurality of planetary gears 53 on the inside. The sun gear 57 is an external gear formed in a disk shape centered on the first center line O1. An outer diameter of the sun gear 57 is smaller than those of the plurality of planetary gears 53. The sun gear 57 is not limited to having a disk shape and may have a cylindrical shape. That is, a thickness of the sun gear 57 is not limited at all. Further, the sun gear 57 is not limited to having the outer diameter smaller than those of the plurality of planetary gears 53. Therefore, a size of the sun gear 57 may be the same as or larger than those of the plurality of planetary gears 53.

As shown in FIG. 2, the sun shaft 58 is an output shaft in which the sun gear 57 is fixed to one end portion (end portion close to the driving machine 2) of the sun shaft 58. The sun shaft 58 rotates about the first center line O1 together with the sun gear 57 to which the rotation of the planetary gear 53 is transmitted. The sun shaft 58 is formed in a columnar shape centered on the first center line O1. The axis of the sun shaft 58 coincides with the first center line O1 of the auxiliary shaft 45. That is, the sun shaft 58 is disposed at a position that is parallel to and radially outward from the drive shaft 21.

The second bearing 59 rotatably supports the sun shaft 58 with respect to the gearbox casing 60. The second bearing 59 is fixed to the first gear support portion 55A. The second bearing 59 of the present embodiment is a tilting pad bearing. The second bearing 59 is disposed at a position close to the compressor 3 with respect to the sun gear 57. The second bearing 59 is not limited to the structure fixed to the first gear support portion 55A as long as the second bearing 59 may be in a non-movable state with respect to the gearbox casing 60. For example, the second bearing 59 may be directly fixed to the gearbox casing 60. Further, the second bearing 59 may be a bearing to which a damping function for damping the vibration of the sun shaft 58 is added.

The gearbox casing 60 accommodates the plurality of planetary gears 53, the plurality of planetary gear shafts 54, the gear support portion 55, the second gear 56A, the sun gear 57, the sun shaft 58, and the second bearing 59. The gearbox casing 60 is formed in a tubular shape with the second side Da2 in the axial direction Da open. An opening of the gearbox casing 60 on the second side Da2 in the axial direction Da forms a second insertion hole 60h having a size through which the first gear 48A is insertable. As shown in FIG. 2, the gearbox casing 60 of the present embodiment includes a lower half casing 61 and an upper half casing 62.

The lower half casing 61 covers the plurality of planetary gears 53, the plurality of planetary gear shafts 54, the gear support portion 55, the second gear 56A, the sun gear 57, the sun shaft 58, and the second bearing 59 from below Dvb in a vertical direction Dv. As shown in FIG. 3, the lower half casing 61 has, for example, a semicircular cross-sectional shape when viewed from the axial direction Da, and opens toward above Dvu in the vertical direction Dv.

The upper half casing 62 covers the plurality of planetary gears 53, the plurality of planetary gear shafts 54, the gear support portion 55, the second gear 56A, the sun gear 57, the sun shaft 58, and the second bearing 59 from above Dvu in the vertical direction Dv. The upper half casing 62 has, for example, a semicircular cross-sectional shape when viewed from the axial direction Da, and opens toward below Dvb in the vertical direction Dv. The upper half casing 62 is detachably connected to the lower half casing 61 by fixing members such as bolts at both end portions in the circumferential direction Dc.

As shown in FIGS. 1 and 2, the sun shaft 58 passes through the gearbox casing 60 so that a tip on the first side Da1 in the axial direction Da is disposed in the gearbox casing 60. The sun shaft 58 is not limited to the structure that passes through the gearbox casing 60 so that the tip is disposed in the gearbox casing 60. When a joint is used, the sun shaft 58 may not have a structure passing through the gearbox casing 60 as long as the sun shaft 58 is accommodated in the gearbox casing 60.

The rotary mechanical system 1A of the present embodiment further includes a coupling 100 and a coupling cover 120. The coupling 100 connects an end portion of the sun shaft 58 on the second side Da2 in the axial direction Da and an end portion of the rotary machine shaft 35 of the compressor 3. An end portion of the coupling 100 on the first side Da1 in the axial direction Da is detachably connected to the sun shaft 58 by a fixing member such as a bolt. An end portion of the coupling 100 on the second side Da2 in the axial direction Da is detachably connected to the rotary machine shaft 35 by a fixing member such as a bolt.

The coupling cover 120 covers the coupling 100 between the gearbox casing 60 and the compressor 3. As shown in FIG. 2, the coupling cover 120 of the present embodiment includes a lower cover 121 and an upper cover 122.

The lower cover 121 covers the coupling 100, an end portion of the sun shaft 58 connected to the coupling 100, and an end portion of the rotary machine shaft 35 from below Dvb in the vertical direction Dv. The lower cover 121 has, for example, a semicircular cross-sectional shape when viewed from the axial direction Da, and opens toward above Dvu in the vertical direction Dv. The lower cover 121 is detachable from the foundation.

The upper cover 122 covers the coupling 100, the end portion of the sun shaft 58 connected to the coupling 100, and the end portion of the rotary machine shaft 35 from above Dvu in the vertical direction Dv. The upper cover 122 has, for example, a semicircular cross-sectional shape when viewed from the axial direction Da, and opens toward below Dvb in the vertical direction Dv. The upper cover 122 is detachably connected to the lower cover 121 by fixing members such as bolts at both end portions in the circumferential direction Dc.

(Maintenance Method of Rotary Mechanical System)

Figure 4:
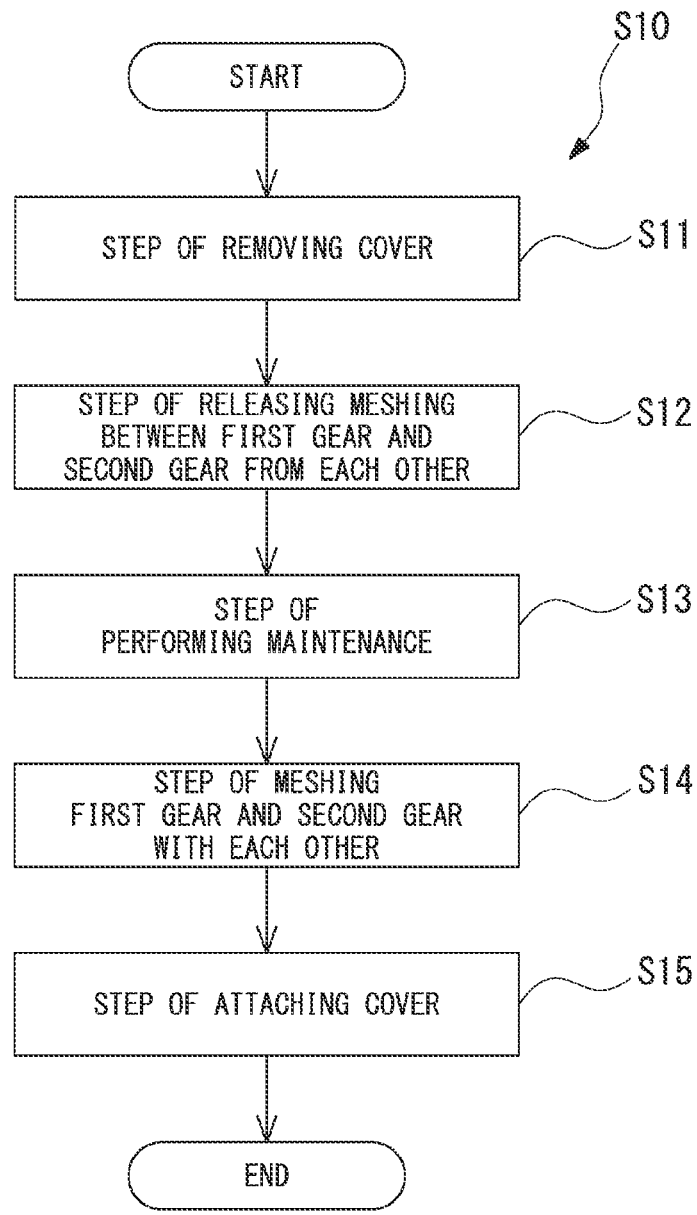
FIG. 4 is a flowchart showing a procedure of a maintenance method of the rotary mechanical system according to the embodiment of the present disclosure.

Next, a maintenance method S10 of the rotary mechanical system 1A as described above will be described. As shown in FIG. 4, the maintenance method S10 of the rotary mechanical system 1A according to the embodiment of the present disclosure includes a step S11 of removing a cover, a step S12 of releasing meshing between the first gear 48A and the second gear 56A from each other, a step S13 of performing maintenance, a step S14 of meshing the first gear 48A and the second gear 56A with each other, and a step S15 of attaching the cover.

Figure 5:
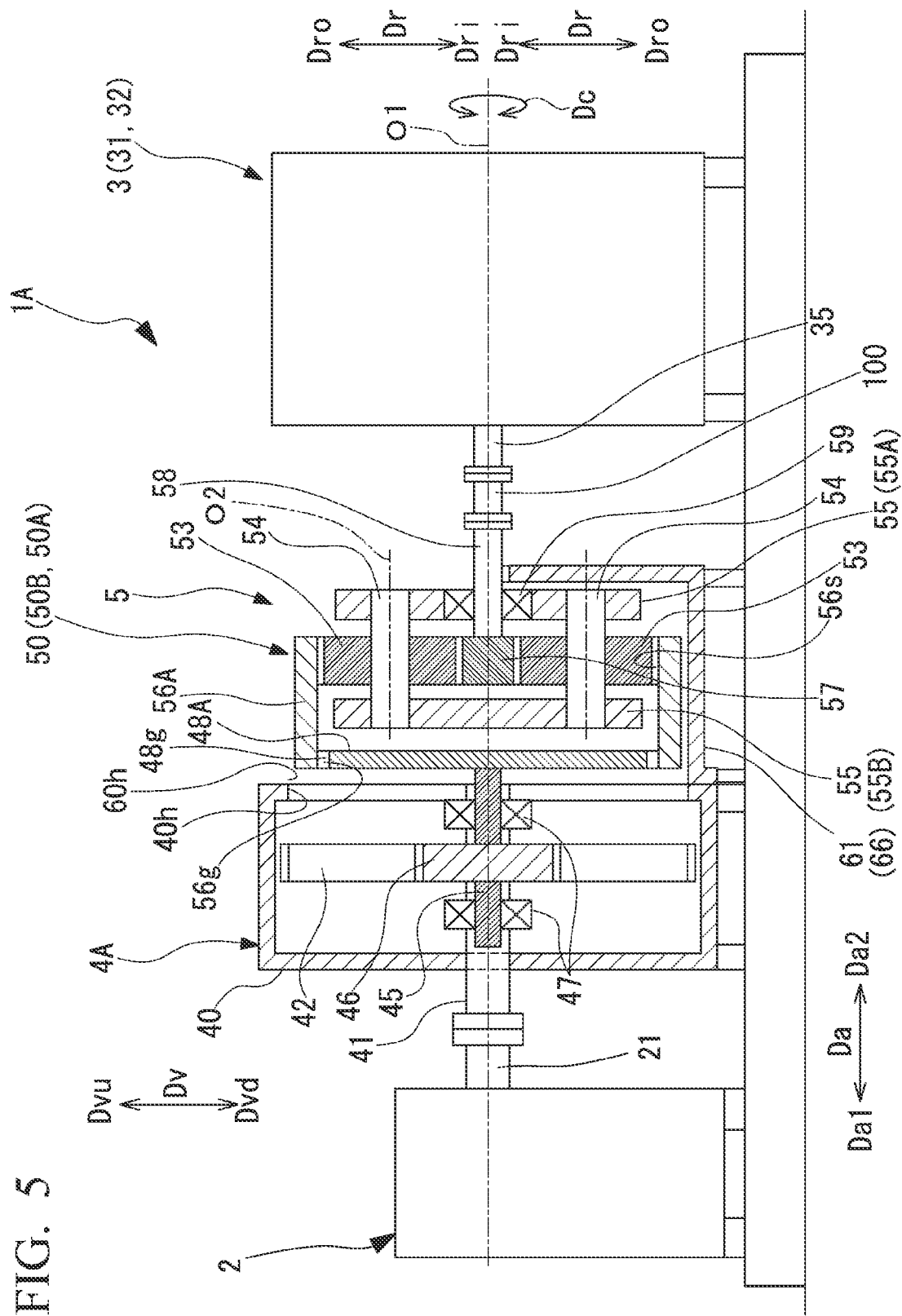
FIG. 5 is a view showing a state in which an upper half casing of a gearbox casing of the rotary mechanical system and an upper cover of a coupling cover are removed.

In step S11 of removing the cover, the fixation of the upper half casing 62 and the lower half casing 61 by fixing members in the gearbox casing 60 is released. Similarly, the fixation by the fixing members between the upper cover 122 and the lower cover 121 is released. After that, the upper half casing 62 is removed from the lower half casing 61, as shown in FIG. 5. Accordingly, a portion of above Dvu the planetary gear mechanism 50 in the vertical direction Dv is exposed. After that, the upper cover 122 and the lower cover 121 are removed. Accordingly, the coupling 100 is exposed.

Figure 6:
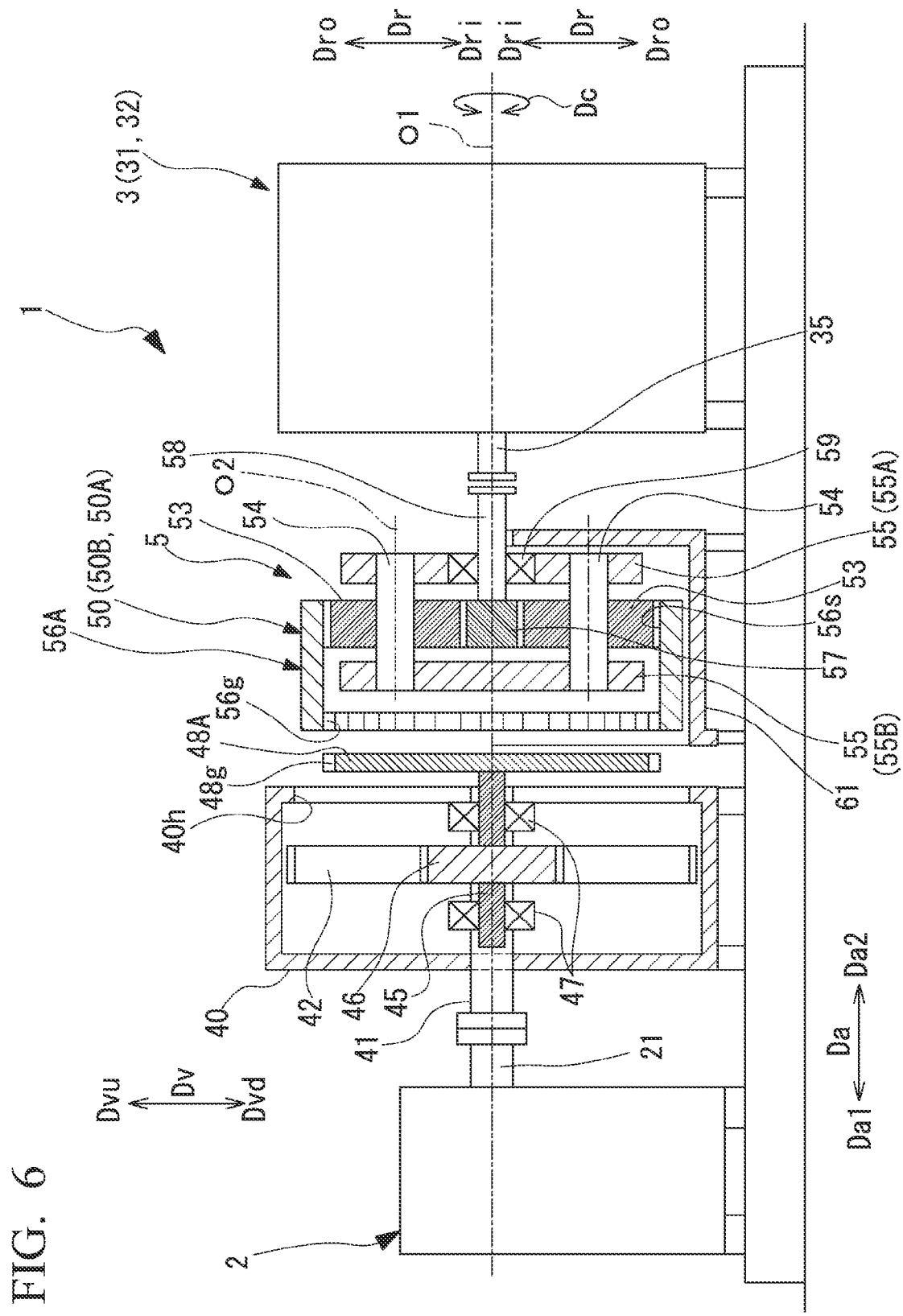
FIG. 6 is a view showing a state in which a first gear and a second gear of the rotary mechanical system are separated.

In step S12 of releasing meshing between the first gear 48A and the second gear 56A from each other, as shown in FIG. 6, at least one of the transmission unit 4A and the gearbox 5 is relatively moved to be apart from each other in the axial direction Da. In the present embodiment, the gearbox 5 is moved to be apart from the transmission unit 4A in the axial direction Da by moving the gearbox 5 to the second side Da2 in the axial direction Da. Specifically, the coupling 100 is removed from the sun shaft 58 and the rotary machine shaft 35. Using the space from which the coupling 100 and the coupling cover 120 are removed, the gearbox 5 is moved to come close to the compressor 3. At this time, the first tooth portion 48g and the second tooth portion 56g are spur teeth whose teeth traces are parallel to the central axis O. Therefore, the meshing of the first gear 48A and the second gear 56A with each other is released by relatively moving the first gear 48A of the transmission unit 4A and the second gear 56A of the gearbox 5 to be apart from each other in the axial direction Da in which the central axis O extends.

In step S13 of performing maintenance, required maintenance is performed on at least one of the transmission unit 4A and the gearbox 5. In the present embodiment, the content of the maintenance performed in step S13 is not limited. The transmission unit 4A includes the casing 40 in which the first insertion hole 40h is formed in the casing 40. Therefore, a state inside the casing 40 can be visually confirmed through the first insertion hole 40h. In addition, maintenance work can be performed on the planetary gear mechanism 50 inside the gearbox 5 in a state where the upper half casing 62 is removed. Since the gearbox 5 is disconnected from the compressor 3 by removing the coupling 100, maintenance may be performed by removing the gearbox 5 from the rotary mechanical system 1A by a crane or the like.

In step S14 of meshing the first gear 48A and the second gear 56A with each other, the first gear 48A and the second gear 56A mesh with each other after finishing of the required maintenance in step S13. For this, at least one of the transmission unit 4A and the gearbox 5 is relatively moved to come close to each other in the axial direction Da to mesh the first gear 48A and the second gear 56A with each other. In the present embodiment, the gearbox 5 is moved to approach the transmission unit 4A in the axial direction Da by moving the gearbox 5 to the first side Da1 in the axial direction Da. At this time, the first tooth portion 48g and the second tooth portion 56g are spur teeth whose teeth traces are parallel to the central axis O. Therefore, it is possible to mesh the first gear 48A and the second gear 56A with each other by relatively moving the first gear 48A of the transmission unit 4A and the second gear 56A of the gearbox 5 to come close to each other the axial direction Da.

In step S15 of attaching the cover, the coupling 100 is attached to the sun shaft 58 and the rotary machine shaft 35. After that, the upper cover 122 and the lower cover 121 are attached. Furthermore, the upper half casing 62 is attached to the lower half casing 61. In this manner, the maintenance of the rotary mechanical system 1A is finished.

(Action Effects)

In the rotary mechanical system 1A and the maintenance method S10 of the present embodiment, the transmission unit 4A and the gearbox 5 mesh with the first gear 48A of the transmission unit 4A and the second gear 56A of the gearbox 5. Accordingly, the rotation of the drive shaft 21 transmitted to the transmission unit 4A is transmitted to the gearbox 5. As a result, the rotation of the drive shaft 21 is transmitted to the rotary machine shaft 35 of the compressor 3 via the transmission unit 4A and the gearbox 5. Further, the first tooth portion 48g and the second tooth portion 56g, which mesh with each other, are spur teeth whose teeth traces are parallel to the central axis O. Therefore, the first gear 48A of the transmission unit 4A and the second gear 56A of the gearbox 5 can be relatively moved in the axial direction Da. Therefore, a state of meshing the first gear 48A and the second gear 56A with each other can be switched by relatively moving at least one of the transmission unit 4A and the gearbox 5 to be apart from each other in the axial direction Da. Accordingly, when performing maintenance on at least one of the transmission unit 4A and the gearbox 5, the transmission unit 4A and the gearbox 5 can be easily disassembled and assembled. In other words, it can easily transition to maintenance work. In this way, it is possible to easily perform disconnection work and connection work between the transmission unit 4A and the gearbox 5, and the maintainability of the rotary mechanical system 1A can be improved.

The first gear 48A is disposed outside the casing 40. Therefore, when performing disconnection work and connection work between the transmission unit 4A and the gearbox 5, it is possible to easily visually confirm a state of meshing the first gear 48A and the second gear 56A with each other. Therefore, it is possible to further improve the maintainability of the rotary mechanical system 1A.

Furthermore, since the first insertion hole 40h formed in the casing 40 has a size formed such that the first gear 48A is insertable, it is possible to easily visually confirm an internal state of the casing 40 of the transmission unit 4A through the first insertion hole 40h. Therefore, it is possible to improve the maintainability of the transmission unit 4A.

In addition, the gearbox casing 60 can be divided into the lower half casing 61 and the upper half casing 62. Therefore, when performing release work of meshing between the first gear 48A and the second gear 56A from each other and meshing work of the first gear 48A and the second gear 56A with each other, it is possible to remove the upper half casing 62 from the lower half casing 61. Therefore, a state of meshing the first gear 48A and the second gear 56A with each other can be switched while visually confirming a state of meshing the first gear 48A and the second gear 56A with each other. Furthermore, maintenance work inside the gearbox 5 can be easily performed. Therefore, it is possible to further improve the maintainability of the rotary mechanical system 1A.

Furthermore, the coupling cover 120 that covers the coupling 100 connecting the sun shaft 58 and the rotary machine shaft 35 can be divided into the lower cover 121 and the upper cover 122. The coupling 100 can be removed to easily perform release work between the sun shaft 58 and the rotary machine shaft 35 by removing the upper cover 122 from the lower cover 121. As a result, it is possible to easily secure a space between the gearbox 5 and the compressor 3. That is, it is possible to easily secure a space for moving the gearbox 5 to be apart from the transmission unit 4A in the axial direction Da. Accordingly, the gearbox 5 can be moved to switch a state of meshing the first gear 48A and the second gear 56A with each other. Therefore, it is possible to further improve the maintainability of the rotary mechanical system 1A.

In the rotary mechanical system 1A of the present embodiment, the driving machine 2 is a motor and the compressor 3 is a compressor. Accordingly, in the rotary mechanical system 1A that drives the compressor by the motor, it is possible to easily perform disconnection work and connection work between the transmission unit 4A and each gearbox 5, and the maintainability can be improved.

Second Embodiment

Next, a second embodiment of the rotary mechanical system according to the present disclosure will be described. In the second embodiment to be described below, the same reference numerals are given in the drawings to the configurations common to the first embodiment, and descriptions thereof will be omitted.

Figure 7:
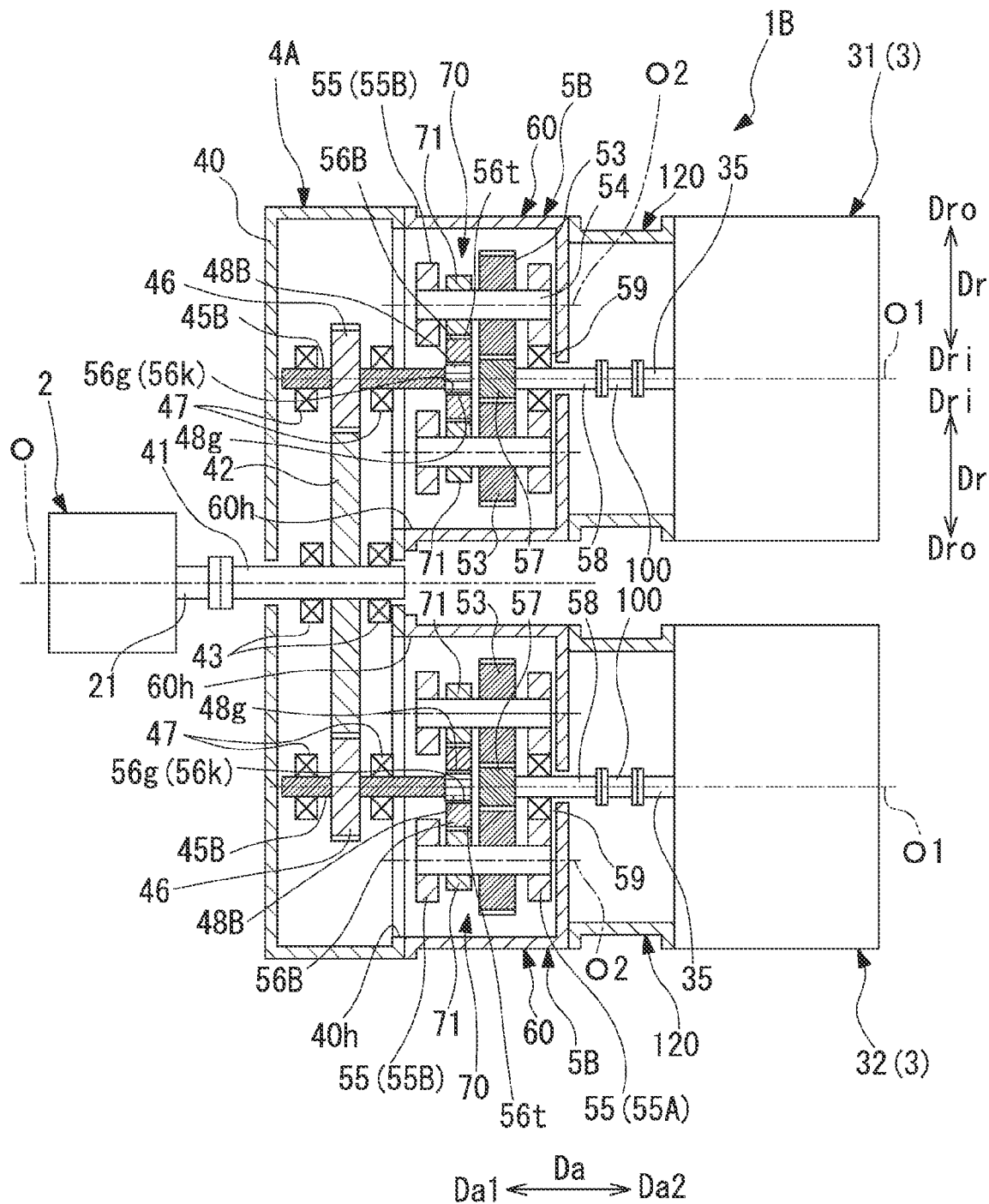
FIG. 7 is a schematic view showing a schematic configuration of a rotary mechanical system according to a second embodiment of the present disclosure.

As shown in FIG. 7, in a rotary mechanical system 1B of the second embodiment, a configuration of the connecting portion between a transmission unit 4B and a gearbox 5B is different from that of the first embodiment.

The configuration of the first gear 48B is different in the transmission unit 4B. The first gear 48B is fixed to the auxiliary shaft 45B. The first gear 48B rotates about the first center line O1 together with the auxiliary shaft 45B. The first gear 48B is fixed to an end portion of the auxiliary shaft 45B on the second side Da2 in the axial direction Da. The first gear 48B is disposed outside the casing 40 so that the first gear 48B protrudes from the casing 40 to the second side Da2 in the axial direction Da. The first gear 48A is an external gear formed in a disk shape centered on the first center line O1. The first gear 48B of the second embodiment has a smaller outer diameter than that of the auxiliary gear 46. The first gear 48B is an external gear formed in a disk shape centered on the first center line O1. The first gear 48B is a spur gear having a plurality of first tooth portions 48g which are spur teeth whose teeth traces are parallel to the first center line O.

The gearbox 5B of the second embodiment includes a gear mechanism 70. A plurality of gear mechanisms 70 (three in the present embodiment) are disposed to surround the main shaft 41. The gear mechanism 70 is connected to one corresponding compressor 3 in a one-to-one relationship. The gear mechanism 70 transmits the rotation of the main shaft 41 to the rotary machine shaft 35 of one corresponding compressor 3. The plurality of gear mechanisms 70 have the same configuration. The gear mechanism 70 includes a plurality of planetary gears 53, a plurality of planetary gear shafts 54, a gear support portion 55, a second gear 56B, an outer peripheral gear 71, a sun gear 57, and a sun shaft (output shaft) 58, and a second bearing 59.

The second gear 56B meshes with the first gear 48B. The second gear 56B is disposed in the gearbox casing 60. The second gear 56B is an external gear having a disk shape centered on the first center line O1, and the second gear 56B includes a through hole 56k formed in a center portion when viewed from the axial direction Da. The second gear 56B has the second tooth portion 56g on the inner peripheral surface of the through hole 56k. A plurality of second tooth portions 56g are spaced apart from each other in the circumferential direction Dc of the second gear 56B. Each second tooth portion 56g is a spur tooth whose tooth trace is parallel to the central axis O. The second tooth portion 56g meshes with the first tooth portion 48g. The number of teeth of the first tooth portion 48g and the number of teeth of the second tooth portion 56g are the same. The second tooth portion 56g is disposed between adjacent first tooth portions 48g in the circumferential direction Dc among the plurality of first tooth portions 48g. That is, the first gear 48B is spline-fitted into the through hole 56k of the second gear 56B. When the second gear 56B is in a state of meshing with the first gear 48B, the second tooth portion 56g is in contact with the first tooth portion 48g. As a result, the second gear 56B rotates together with the auxiliary shaft 45B.

The second gear 56B of the second embodiment is an external gear that further includes a plurality of external teeth 56t on the outer peripheral surface of the second gear 56B. The second gear 56B has, for example, the same outer diameter as that of the auxiliary gear 46. The second gear 56B is not limited to having the same outer diameter as that of the auxiliary gear 46. For example, the second gear 56B may have a larger or smaller outer diameter than that of the auxiliary gear 46. One second gear 56B is disposed corresponding to one auxiliary gear 46.

The outer peripheral gear 71 is disposed on the outside Dro in the radial direction Dr centered on the first center line O1 with respect to the second gear 56B. The outer peripheral gear 71 is a gear different from the planetary gear 53. The outer peripheral gear 71 is fixed to the planetary gear shaft 54 at a position away from the planetary gear 53 on the first side Da1 in the axial direction Da. The outer peripheral gear 71 is disposed at a position close to the driving machine 2 with respect to the planetary gear 53. The outer peripheral gear 71 is an external gear formed in a disk shape centered on the second center line O2. The outer peripheral gear 71 meshes with the plurality of external teeth 56t formed on the outer peripheral surface of the second gear 56B.

The outer peripheral gear 71, for example, has a smaller outer diameter than that of the planetary gear 53. The outer peripheral gear 71 is not limited to having the outer diameter smaller than that of the planetary gear 53. For example, the outer peripheral gear 71 may have a larger outer diameter than the planetary gear 53 or may have the same outer diameter as that of the planetary gear 53. A plurality of outer peripheral gears 71 are disposed so that one outer peripheral gear 71 is disposed corresponding to one planetary gear 53. The plurality of outer peripheral gears 71 rotate about the second center line O2. The positions of the outer peripheral gear 71 and the second gear 56B in the axial direction Da overlap with the first gear 48B.

In such a rotary mechanical system 1B, similarly to the first embodiment, when performing maintenance on the rotary mechanical system 1B, it is possible to easily release meshing between the first gear 48B and the second gear 56B from each other and mesh the first gear 48B and the second gear 56B with each other by relatively moving at least one of the transmission unit 4B and the gearbox 5B to be apart from each other in the axial direction Da. That is, the maintenance of the rotary mechanical system 1B can be performed in the same manner as the maintenance method S10 of the rotary mechanical system 1A shown in FIG. 4 in the first embodiment.

(Action Effects)

In this rotary mechanical system 1B, the first gear 48B of the transmission unit 4B and the second gear 56B of the gearbox 5B can be relatively moved in the axial direction Da. Therefore, it is possible to easily perform disconnection work and connection work between the transmission unit 4B and the gearbox 5B, and the maintainability of the rotary mechanical system 1B can be improved.

Other Embodiments

As described above, the embodiments of the present disclosure are described in detail with reference to the drawings. However, the specific configurations are not limited to the embodiments and include a design modification or the like within a scope which does not depart from the gist of the present disclosure.

In the present embodiment, the speed of the sun shaft 58 increases to a peripheral speed of 10,000 rotations or more to operate the plurality of compressors 3 at high speed. However, as long as the plurality of compressors 3 are operated at high speed, rotation speeds of the plurality of compressors 3 may be different from each other. That is, the first compressor 31, the second compressor 32, and the third compressor may be operated at different rotation speeds.

In addition, although the compressor 3 is given as an example of the rotary machine in the embodiments, there is no question about the application, configuration, and the like of the rotary machine at all. For example, the rotary machine may be a drive system, a wind turbine, or the like around a propeller shaft included in a ship or the like.

<Additional Note>

The rotary mechanical systems 1A and 1B and the maintenance method S10 of the rotary mechanical systems 1A and 1B described in each embodiment are understood, for example, as follows.

(1) Rotary mechanical systems 1A and 1B according to a first aspect include a driving machine 2 that includes a drive shaft 21 that is rotationally driven around a central axis O, transmission units 4A and 4B that include a main shaft 41 connected to the drive shaft 21, a main gear 42 fixed to the main shaft 41, an auxiliary gear 46 meshing with the main gear 42, at least one auxiliary shaft 45 and 45B fixed to the auxiliary gear 46, and first gears 48A and 48B rotatable together with the at least one auxiliary shaft 45 and 45B, at least one gearboxes 5 and 5B that include second gears 56A and 56B meshing with the first gears 48A and 48B, and an output shaft 58 that configured to shift and output a rotation speed of the second gears 56A and 56B, and at least one rotary machine 3 that includes a rotary machine shaft 35 connected to the output shaft 58 and in which the rotary machine shaft 35 is rotationally driven by transmission of a rotation of the output shaft 58, in which the first gears 48A and 48B are spur gears having a plurality of first tooth portions 48g which are spur teeth whose teeth traces are parallel to the central axis O, and the second gears 56A and 56B have a plurality of second tooth portions 56g which are spur teeth whose teeth traces are parallel to the central axis O, and each of which is disposed between adjacent first tooth portions 48g among the plurality of first tooth portion 48g.

Examples of the driving machine 2 include a motor and a steam turbine.

Examples of the rotary machine 3 include a drive system, a wind turbine, or the like around a propeller shaft included in a compressor, a ship, or the like.

In this rotary mechanical systems 1A and 1B, the transmission units 4A and 4B and gearboxes 5 and 5B are configured so that the first gears 48A and 48B of the transmission units 4A and 4B and the second gears 56A and 56B of the gearboxes 5 and 5B mesh with each other. Accordingly, the rotation of the drive shaft 21 transmitted to the transmission units 4A and 4B is transmitted to the gearboxes 5 and 5B. As a result, the rotation of the drive shaft 21 is transmitted to the rotary machine shaft 35 of the compressor 3 via the transmission units 4A and 4B and the gearboxes 5 and 5B. Further, the first tooth portion 48g and the second tooth portion 56g, which mesh with each other, are spur teeth whose teeth traces are parallel to the central axis O. Therefore, the first gear 48A and the second gear 56A can be relatively moved in the axial direction Da. Therefore, a state of meshing the first gear 48A and the second gear 56A with each other can be switched by relatively moving at least one of the transmission units 4A and 4B and the gearboxes 5 and 5B to be apart from each other in the axial direction Da. Accordingly, when performing maintenance on at least one of the transmission units 4A and 4B and the gearboxes 5 and 5B, the transmission units 4A and 4B and the gearboxes 5 and 5B can easily be disassembled and assembled. In other words, it can easily transition to maintenance work. In this way, it is possible to easily perform disconnection work and connection work between the transmission units 4A and 4B and the gearboxes 5 and 5B, and the maintainability of the rotary mechanical systems 1A and 1B can be improved.

(2) The rotary mechanical systems 1A and 1B according to a second aspect are the rotary mechanical systems 1A and 1B of (1), and the transmission units 4A and 4B include a casing 40 that covers the main shaft 41, the main gear 42, the at least one auxiliary gear 46, and the auxiliary shafts 45 and 45B, and the first gears 48A and 48B are disposed outside the casing 40.

Accordingly, when performing disconnection work and connection work between the transmission units 4A and 4B and the gearboxes 5 and 5B, it is possible to easily visually confirm a state of meshing the first gears 48A and 48B and the second gears 56A and 56B with each other. Therefore, it is possible to further improve the maintainability of the rotary mechanical systems 1A and 1B.

(3) The rotary mechanical systems 1A and 1B according to a third aspect are the rotary mechanical systems 1A and 1B of (2), and the casing 40 has an insertion hole 40h which has a size formed such that the first gears 48A and 48B are insertable and through which the at least one auxiliary shaft 45 and 45B is inserted, and the first gears 48A and 48B are fixed to an end portion of the at least one auxiliary shafts 45 and 45B that protrudes from the casing 40 through the insertion hole 40h.

Accordingly, it is possible to easily visually confirm the internal state of the casing 40 of the transmission units 4A and 4B through the first insertion hole 40h. Therefore, it is possible to improve the maintainability of the transmission units 4A and 4B.

(4) The rotary mechanical systems 1A and 1B according to a fourth aspect are the rotary mechanical systems 1A and 1B of (2) or (3), and the at least one gearbox 5 and 5B include a gearbox casing 60, and the gearbox casing 60 includes a lower half casing 61 that covers the second gears 56A and 56B and the output shaft 58 from below Dvb in a vertical direction Dv, and an upper half casing 62 that covers the second gears 56A and 56B and the output shaft 58 from above Dvu in the vertical direction Dv and is detachably disposed with respect to the lower half casing 61.

Accordingly, when performing release work of meshing between the first gears 48A and 48B and the second gears 56A and 56B from each other and meshing work of the first gears 48A and 48B the second gears 56A and 56B with each other, the upper half casing 62 can be removed from the lower half casing 61. Therefore, a state of meshing the first gears 48A and 48B and the second gears 56A and 56B with each other can be switched while visually confirming a state of meshing the first gears 48A and 48B and the second gears 56A and 56B with each other. Furthermore, maintenance work inside the gearbox 5 can be easily performed. Therefore, it is possible to further improve the maintainability of the rotary mechanical systems 1A and 1B.

(5) The rotary mechanical systems 1A and 1B according to a fifth aspect are the rotary mechanical systems 1A and 1B of any one of (1) to (4), which further include a coupling 100 that detachably connects the output shaft 58 and the rotary machine shaft 35, and a coupling cover 120 that covers the coupling 100, and the coupling cover 120 includes a lower cover 121 that covers the coupling 100 from below Dvb in a vertical direction Dv, and an upper cover 122 that covers the coupling 100 from above Dvu in the vertical direction Dv and is detachably disposed with respect to the lower cover 121.

Accordingly, the coupling 100 can be removed to easily perform release work between the sun shaft 58 and the rotary machine shaft 35 by removing the upper cover 122 from the lower cover 121. As a result, it is possible to easily secure a space between the gearboxes 5 and 5B and the compressor 3. That is, it is possible to easily secure a space for moving the gearboxes 5 and 5B to be apart from the transmission units 4A and 4B in the axial direction Da. Accordingly, the gearboxes 5 and 5B can be moved to switch a state of meshing the first gears 48A and 48B and the second gears 56A and 56B with each other. Therefore, it is possible to further improve the maintainability of the rotary mechanical systems 1A and 1B.

(6) The rotary mechanical system 1A according to a sixth aspect is the rotary mechanical system 1A of any one of (1) to (5), and the second gear 56A is an internal gear that has the second tooth portions 56g on an inner peripheral surface.

(7) The rotary mechanical system 1B according to a seventh aspect is the rotary mechanical system 1B of any one of (1) to (5), and the second gear 56B is an external gear that has the second tooth portions 56g on an inner peripheral surface and further has a plurality of teeth on an outer peripheral surface.

(8) The rotary mechanical systems 1A and 1B according to an eighth aspect are the rotary mechanical systems 1A and 1B of any one of (1) to (7), and the transmission units 4A and 4B include a plurality of the auxiliary shafts 45 and 45B as the at least one auxiliary shaft 45 and 45B disposed radially outward of the main shaft 41 with respect to the main shaft 41 and spaced apart from each other in a circumferential direction with respect to the main shaft 1. And, the rotary mechanical system 1A and 1B further includes a plurality of the gearboxes 5 and 5B as the at least one gearbox 5 and 5B and a plurality of the rotary machines 3 as the at least one rotary machine 3 such that the plurality of gearboxes 5 and 5B and the plurality of rotary machines 3 correspond to the plurality of auxiliary shafts 45 and 45B, a rotation of each of the auxiliary shafts 45 and 45B being transmitted to the gearboxes 5 and 5B and to the rotary machine 3.

Accordingly, the transmission units 4A and 4B include the plurality of auxiliary shafts 45 and 45B are disposed radially outward of the main shaft 41 and spaced apart from each other in the circumferential direction, and the gearboxes 5 and 5B and the rotary machine 3 are disposed such that the gearboxes 5 and 5B and the rotary machine 3 correspond to each of the plurality of auxiliary shafts 45 and 45B. In such a configuration, the first gears 48A and 48B that rotate together with the auxiliary shafts 45 and 45B, and the second gears 56A and 56B of the gearboxes 5 and 5B corresponding to the auxiliary shafts 45 and 45B mesh with each other. The first gears 48A and 48B of the auxiliary shafts 45 and 45B and the second gears 56A and 56B of the gearboxes 5 and 5B corresponding to the auxiliary shafts 45 and 45B can be relatively moved in the axial direction Da along the central axis O. Therefore, it is possible to easily perform disconnection work and connection work between the transmission units 4A and 4B and the gearboxes 5 and 5B.

(9) The rotary mechanical systems 1A and 1B according to a ninth aspect are the rotary mechanical systems 1A and 1B of any one of (1) to (8), and the driving machine 2 is a motor and the rotary machine 3 is a compressor.

Accordingly, in the rotary mechanical systems 1A and 1B that drives the compressor by the motor, it is possible to easily perform disconnection work and connection work between the transmission units 4A and 4B and the gearboxes 5 and 5B, and the maintainability can be improved.

(10) A maintenance method S10 of rotary mechanical systems 1A and 1B according to a tenth aspect including a driving machine 2 that includes a drive shaft 21 that is rotationally driven around a central axis O, transmission units 4A and 4B that include a main shaft 41 connected to the drive shaft 21, a main gear 42 fixed to the main shaft 41, an auxiliary gear 46 meshing with the main gear 42, at least one auxiliary shaft 45 and 45B fixed to the auxiliary gear 46, and first gears 48A and 48B rotatable together with the at least one auxiliary shaft 45 and 45B, at least one gearbox 5 and 5B that include second gears 56A and 56B meshing with the first gears 48A and 48B, and an output shaft 58 that configured to shift and output a rotation speed of the second gears 56A and 56B, and at least one rotary machine 3 that includes a rotary machine shaft 35 connected to the output shaft 58 and in which the rotary machine shaft 35 is rotationally driven by transmission of a rotation of the output shaft 58, the first gears 48A and 48B having a plurality of first tooth portions 48g which are spur teeth whose teeth traces are parallel to the central axis O, and the second gears 56A and 56B having a plurality of second tooth portions 56g which are spur teeth whose teeth traces are parallel to the central axis O. and each of which is disposed between adjacent first tooth portions 48g among the plurality of first tooth portion 48g, the maintenance method S10 includes a step S12 of relatively moving at least one of the transmission unit 4A and 4B and the at least one gearbox 5 and 5B to be apart from each other in an axial direction Da in which the central axis O extends to release meshing between the first gears 48A and 48B and the second gears 56A and 56B from each other, a step S13 of performing maintenance on at least one of the transmission unit 4A and 4B and the at least one gearbox 5 and 5B, and a step S14 of relatively moving at least one of the transmission unit 4A and 4B and the at least one gearbox 5 and 5B to come close to each other in the axial direction Da to mesh the first gears 48A and 48B and the second gears 56A and 56B with each other.

In this maintenance method S10 of the rotary mechanical systems 1A and 1B, the transmission units 4A and 4B and the gearboxes 5 and 5B are configured so that the first gears 48A and 48B of the transmission units 4A and 4B and the second gears 56A and 56B of the gearboxes 5 and 5B mesh with each other. Accordingly, the rotation of the drive shaft 21 transmitted to the transmission units 4A and 4B is transmitted to the gearboxes 5 and 5B. As a result, the rotation of the drive shaft 21 is transmitted to the rotary machine shaft 35 of the compressor 3 via the transmission units 4A and 4B and the gearboxes 5 and 5B. Further, the first tooth portion 48*g* and the second tooth portion 56*g*, which mesh with each other, are spur teeth whose teeth traces are parallel to the central axis O. Therefore, the first gear 48A and the second gear 56A can be relatively moved in the axial direction Da. Therefore, a state of meshing the first gear 48A and the second gear 56A with each other can be switched by relatively moving at least one of the transmission units 4A and 4B and the gearboxes 5 and 5B to be apart from each other in the axial direction Da. Accordingly, when performing maintenance on at least one of the transmission units 4A and 4B and the gearboxes 5 and 5B, the transmission units 4A and 4B and the gearboxes 5 and 5B can be easily disassembled and assembled. In other words, it can easily transition to maintenance work. In this way, it is possible to easily perform disconnection work and connection work between the transmission units 4A and 4B and the gearboxes 5 and 5B, and the maintainability of the rotary mechanical systems 1A and 1B can be improved.

EXPLANATION OF REFERENCES

1A, 1B: Rotary mechanical system
2: Driving machine
3: Compressor (rotary machine)
4A, 4B: Transmission unit
5, 5B: Gearbox
21: Drive shaft
31: First compressor
32: Second compressor
35: Rotary machine shaft
40: Casing
40*h*: First insertion hole (insertion hole)
41: Main shaft
42: Main gear
43: Main shaft bearing
45, 45B: Auxiliary shaft
46: Auxiliary gear
47: First bearing
48A, 48B: First gear
48*g*: First tooth portion
50: Planetary gear mechanism
50A: First planetary gear mechanism
50B: Second planetary gear mechanism
53: Planetary gear
54: Planetary gear shaft
55: Gear support portion
55A: First gear support portion
55B: Second gear support portion
56A, 56B: Second gear
56*g*: Second tooth portion
56*k*: Through hole
56*s*: Planetary meshing tooth
56*t*: External tooth
57: Sun gear
58: Sun shaft (output shaft)
59: Second bearing
60: Gearbox casing
60*h*: Second insertion hole
61: Lower half casing
62: Upper half casing
70: Gear mechanism
71: Outer peripheral gear
100: Coupling
120: Coupling cover
121: Lower cover
122: Upper cover
Da: Axial direction
Da1: First side
Da2: Second side
Dc: Circumferential direction
Dr: Radial direction
Dri: Inside
Dro: Outside
Dv: Vertical direction
Dvu: Above
Dvb: Below
O: Central axis
O1: First center line
O2: Second center line
S10: Maintenance method of rotary mechanical system
S11: Step of removing cover
S12: Step of releasing meshing between first gear and second gear from each other
S13: Step of performing maintenance
S14: Step of meshing first gear and second gear with each other
S15: Step of attaching cover

What is claimed is:

1. A maintenance method of a rotary mechanical system including a driving machine that includes a drive shaft that is rotationally driven around a central axis, a transmission unit that includes a main shaft connected to the drive shaft, a main gear fixed to the main shaft, an auxiliary gear meshing with the main gear, at least one auxiliary shaft fixed to the auxiliary gear, and a first gear rotatable together with the at least one auxiliary shaft, at least one gearbox that includes a second gear meshing with the first gear, and an output shaft that configured to shift and output a rotation speed of the second gear, and at least one rotary machine that includes a rotary machine shaft connected to the output shaft and in which the rotary machine shaft is rotationally driven by transmission of a rotation of the output shaft, the first gear having a plurality of first tooth portions which are spur teeth whose teeth traces are parallel to the central axis, and the second gear having a plurality of second tooth portions which are spur teeth whose teeth traces are parallel to the central axis, and each of which is disposed between adjacent first tooth portions among the plurality of first tooth portions, the maintenance method comprising:

a step of relatively moving at least one of the transmission unit and the at least one gearbox to be apart from each other in an axial direction in which the central axis extends to release meshing between the first gear and the second gear from each other;

a step of performing maintenance on at least one of the transmission unit and the at least one gearbox; and a step of relatively moving at least one of the transmission unit and the at least one gearbox to come close to each other in the axial direction to mesh the first gear and the second gear with each other.

2. A rotary mechanical system comprising:

a driving machine that includes a drive shaft that is rotationally driven around a central axis;

a transmission unit that includes a main shaft connected to the drive shaft, a main gear fixed to the main shaft, an auxiliary gear meshing with the main gear, at least one auxiliary shaft fixed to the auxiliary gear, and a first gear rotatable together with the at least one auxiliary shaft;

at least one gearbox that includes a second gear meshing with the first gear, and an output shaft that configured to shift and output a rotation speed of the second gear; and at least one rotary machine that includes a rotary machine shaft connected to the output shaft and in which the rotary machine shaft is rotationally driven by transmission of a rotation of the output shaft, wherein the first gear is a spur gear having a plurality of first tooth portions which are spur teeth whose teeth traces are parallel to the central axis, and the second gear has a plurality of second tooth portions which are spur teeth whose teeth traces are parallel to the central axis, and each of which is disposed between adjacent first tooth portions among the plurality of first tooth portions, wherein the rotary mechanical system further comprises:
a coupling that detachably connects the output shaft and the rotary machine shaft; and
a coupling cover that covers the coupling, wherein the coupling cover includes a lower cover that covers the coupling from below in a vertical direction, and an upper cover that covers the coupling from above in the vertical direction and is detachably disposed with respect to the lower cover.

3. The rotary mechanical system according to claim 2, wherein the transmission unit includes a casing that covers the main shaft, the main gear, the auxiliary gear, and the at least one auxiliary shaft, and the first gear is disposed outside the casing.

4. The rotary mechanical system according to claim 3, wherein the casing has an insertion hole which has a size formed such that the first gear is insertable and through which the at least one auxiliary shaft is inserted, and the first gear is fixed to an end portion of the at least one auxiliary shaft that protrudes from the casing through the insertion hole.

5. The rotary mechanical system according to claim 3, wherein the at least one gearbox includes a gearbox casing, and the gearbox casing includes a lower half casing that covers the second gear and the output shaft from below in a vertical direction, and an upper half casing that covers the second gear and the output shaft from above in the vertical direction and is detachably disposed with respect to the lower half casing.

6. The rotary mechanical system according to claim 3, wherein the second gear is an internal gear that has the second tooth portions on an inner peripheral surface.

7. The rotary mechanical system according to claim 2, wherein the second gear is an external gear that has the second tooth portions on an inner peripheral surface and further has a plurality of teeth on an outer peripheral surface.

8. The rotary mechanical system according to claim 2, wherein the driving machine is a motor and the rotary machine is a compressor.

9. A rotary mechanical system comprising:

a driving machine that includes a drive shaft that is rotationally driven around a central axis;

a transmission unit that includes a main shaft connected to the drive shaft, a main gear fixed to the main shaft, an auxiliary gear meshing with the main gear, at least one auxiliary shaft fixed to the auxiliary gear, and a first gear rotatable together with the at least one auxiliary shaft;

at least one gearbox that includes a second gear meshing with the first gear, and an output shaft that configured to shift and output a rotation speed of the second gear; and at least one rotary machine that includes a rotary machine shaft connected to the output shaft and in which the rotary machine shaft is rotationally driven by transmission of a rotation of the output shaft, wherein the first gear is a spur gear having a plurality of first tooth portions which are spur teeth whose teeth traces are parallel to the central axis, and the second gear has a plurality of second tooth portions which are spur teeth whose teeth traces are parallel to the central axis, and each of which is disposed between adjacent first tooth portions among the plurality of first tooth portions, wherein the transmission unit includes a plurality of auxiliary shafts as the at least one auxiliary shaft disposed radially outward of the main shaft with respect to the main shaft and spaced apart from each other in a circumferential direction, and the rotary mechanical system further includes a plurality of gearboxes as the at least one gearbox and a plurality of rotary machines as the at least one rotary machine such that the plurality of gearboxes and the plurality of rotary machines correspond to the plurality of auxiliary shafts, a rotation of each of the auxiliary shafts being transmitted to the gearbox and to the rotary machine.

* * * * *